Oct. 22, 1929.　　　C. F. JENSKY　　　1,732,234

TURBINE BLADE

Filed March 21, 1928

WITNESSES:

INVENTOR
C. F. Jensky
BY
ATTORNEY

Patented Oct. 22, 1929

1,732,234

UNITED STATES PATENT OFFICE

CLARENCE F. JENSKY, OF MOORES, PENNSYLVANIA, ASSIGNOR TO WESTINGHOUSE ELECTRIC & MANUFACTURING COMPANY, A CORPORATION OF PENNSYLVANIA

TURBINE BLADE

Application filed March 21, 1928. Serial No. 263,458.

My invention relates to elastic fluid turbines, and more particularly to the blading thereof, and it has for an object to improve the construction of apparatus of this character.

In the manufacture of turbine blading, it often occurs that several groups of blades will require different inlet angles, while the exit angles for all these groups will be the same. This requires a different set-up for each group having a different inlet angle and makes the process of manufacture rather tedious and relatively expensive. Moreover, where the blades are tapered, the additional time and expense involved in producing a number of blades having various inlet angles becomes quite objectionable. It will also be apparent that, should the inlet angles be constant and the exit angles variable, the same difficulties would be encountered.

A more specific object of this invention, therefore, is to provide a turbine blade, which may be either tapered or straight, and which may be readily manufactured in large quantities and which may be produced with various inlet, or exit angles at relatively small expense.

This and other objects are effected by my invention, as will be apparent from the following description and claims taken in connection with the accompanying drawings, forming a part of this application, in which:

Figure 1:
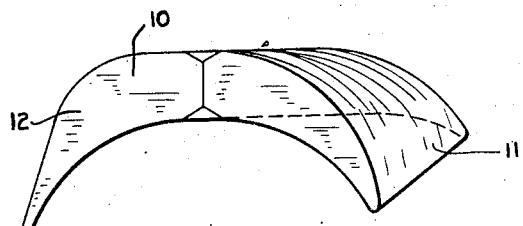
Fig. 1 is a top plan view of a turbine blade.
Figure 2:
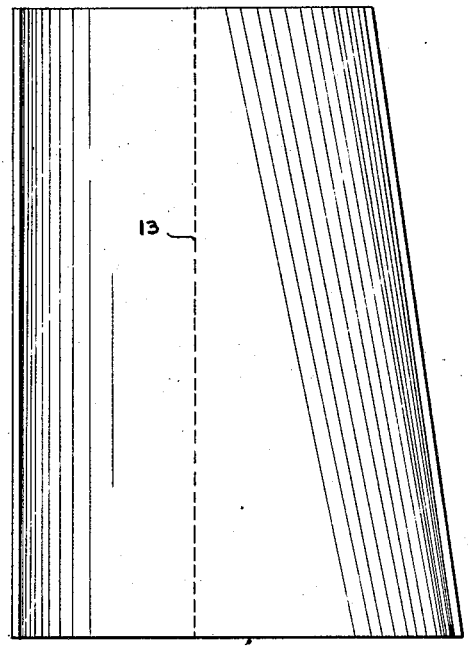
Fig. 2 is a front elevation of the blade shown in Fig. 1.

According to my invention, a turbine blade is made in sections, one section including the inlet edge portion and the other, the outlet edge portion. These sections are then joined together, in any approved manner, to complete the blade. In this way, the inlet and the outlet sides for several blades may be made at one time and then cut to the desired lengths and joined together.

In the drawing I show a tapered blade 10, comprising an inlet part, or section 11, and an exit section 12. These parts are joined together in some suitable manner, preferably by fusion of metal, as by welding, or soldering the sections 11 and 12 together along the line 13. The section 12 is substanatially straight and has a substantially constant cross sectional area throughout the length of the blade. The section 11 is tapered from the base to the tip thereof so as to provide a tapered blade.

In the manufacture of a blade of this type the straight section 12 may be made in strips long enough for several blades and these strips then cut to the lengths desired. The inlet portion 11 would then be forged in machine dies, or machined from bars. It will be quite obvious that this process considerably simplifies the procedure involved in making a tapered blade for it is much easier and quicker to provide the taper required on the section 11 than to attempt to taper the blade as a unit.

Another advantage of this type of construction, and this applies to straight as well as to tapered blades, is that a large number of blades may be produced having various inlet or outlet angles, it being possible to form the inlet and outlet sides separately.

On the blade shown, the exit side may be tapered where necessary by machining the part 12 at the joint along the line 13 so that the width of the part 12 from the joint to the exit edge decreases from the base to the tip. It will also be obvious that where the part 12 is not tapered, it may be used for many different blades as it is independent of the width of the blade, taper or inlet angle. I may also provide a mechanical joint, such as a dovetail for joining the sections 11 and 12 should this be considered desirable.

While I have not shown the root portion on this blade it will be understood that this may be formed in any approved manner, as, for example, by casting the root on the completed blade.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. A turbine blade which is tapered in width from the root to the tip and comprising a section including the inlet edge and a section including the exit edge and means for securing said sections together to form a blade, at least one of the sections diminishing in width from the root to the tip.

2. A turbine blade comprising a section including the inlet edge and a section including the exit edge, one of said sections being straight and the other tapered, and means for securing said sections together to form a blade.

3. A turbine blade comprising a section including the inlet edge and a section including the exit edge, one of said sections being substantially straight and the other tapered, said sections having inner edge portions adapted to be fitted together along a line substantially parallel to the outer edge of the straight section.

4. A turbine blade which is tapered in width comprising a plurality of sections which extend longitudinally of the blade and which are permanently joined together by fusion of metal, the inlet and exit blade edges being provided on said sections and at least one of the sections having its width diminishing from the root to the tip in order to provide for the tapered width.

5. A turbine blade of non-uniform cross section or shape from the root to the tip and comprising a section including the inlet edge and a section including the exit edge and means for permanently securing said sections together by fusion of metal to form the blade, at least one of the sections being of non-uniform cross section or shape from the root to the tip.

6. A turbine blade of non-uniform cross section or shape from the root to the tip and including a longitudinal section having the inlet edge and a longitudinal section having the exit edge, said sections being permanently joined together by fusion of metal and one of the sections having a non-uniform cross section or shape from the root to the tip.

7. A turbine blade which is tapered in width from the root to the tip and including a longitudinal section having the inlet edge, a longitudinal section having the exit edge, said sections being permanently joined together by fusion of metal, the section having the inlet edge tapering in width from the root to the tip and the section having the exit edge being of substantially uniform width from the root to the tip.

In testimony whereof, I have hereunto subscribed my name this 6th day of March, 1928.

CLARENCE F. JENSKY.